US012305926B2

(12) United States Patent
Buragino et al.

(10) Patent No.: US 12,305,926 B2
(45) Date of Patent: May 20, 2025

(54) METHODS FOR PREHEATING METAL-CONTAINING PELLETS

(71) Applicant: Air Products and Chemicals, Inc., Allentown, PA (US)

(72) Inventors: Gregory J. Buragino, Macungie, PA (US); Anup Vasant Sane, Allentown, PA (US); Shailesh Pradeep Gangoli, Allentown, PA (US); Xiaoyi He, Orefield, PA (US); Larry Saul Zelson, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 955 days.

(21) Appl. No.: 17/397,021

(22) Filed: Aug. 9, 2021

(65) Prior Publication Data

US 2021/0364237 A1 Nov. 25, 2021

Related U.S. Application Data

(62) Division of application No. 16/025,230, filed on Jul. 2, 2018, now abandoned.

(Continued)

(51) Int. Cl.

*F27D 13/00* (2006.01)
*C21B 13/00* (2006.01)

(Continued)

(52) U.S. Cl.

CPC .......... *F27D 13/00* (2013.01); *C21B 13/0086* (2013.01); *C21C 5/527* (2013.01);

(Continued)

(58) Field of Classification Search

CPC ....... C21B 13/0086; C21C 5/527; C22B 1/02; F27B 3/085; F27D 13/00; F27D 3/0033

(Continued)

(56) References Cited

U.S. PATENT DOCUMENTS

| | | | | | |
|---|---|---|---|---|---|
| 3,615,353 | A | | 10/1971 | Mahoney | |
| 3,620,519 | A | * | 11/1971 | Forbes | F27B 21/06 266/178 |

(Continued)

FOREIGN PATENT DOCUMENTS

| | | |
|---|---|---|
| CN | 1942594 | 4/2007 |
| CN | 104593537 | 5/2015 |

(Continued)

OTHER PUBLICATIONS

Baukal, C.E., et al, "Heat Transfer from Oxygen-Enhanced/Natural Gas Flames Impinging Normal to a Plane Surface", Experimental Thermal and Fluid Science 16; 1998; 247-259; Elsevier Science Inc.

(Continued)

*Primary Examiner* — Quang T Van

(74) *Attorney, Agent, or Firm* — Jason M. Ploeger

(57) ABSTRACT

A method for preheating metal pellets before charging into a melting furnace, wherein the pellets are transported by a conveyor belt to a chute and discharged from the chute into the melting furnace, the method including heating the pellets by direct flame impingement from two or more banks of burners, wherein the two or more banks of burners comprise an upstream bank of burners and a downstream bank of burners; and controlling the upstream bank of burners to operate oxygen-rich so as to create an oxidizing zone and the downstream bank of burners to operate fuel-rich so as to create a reducing zone.

6 Claims, 11 Drawing Sheets

Related U.S. Application Data

(60) Provisional application No. 62/621,754, filed on Jan. 25, 2018.

(51) Int. Cl.

| | |
|---|---|
| ***C21C 5/52*** | (2006.01) |
| ***C22B 1/02*** | (2006.01) |
| ***F27B 3/08*** | (2006.01) |
| ***F27D 3/00*** | (2006.01) |
| ***F27D 3/08*** | (2006.01) |

(52) U.S. Cl.
CPC ................ *C22B 1/02* (2013.01); *F27B 3/085* (2013.01); *F27D 3/0033* (2013.01)

(58) Field of Classification Search
USPC .......... 373/79, 80, 81, 123, 124; 266/44–47, 266/144, 99, 102, 103–134, 137–141, 266/168–248, 265–270; 148/194, 148/195–205; 75/10.63, 10.66
See application file for complete search history.

(56) References Cited

U.S. PATENT DOCUMENTS

| | | | | |
|---|---|---|---|---|
| 3,632,099 | A * | 1/1972 | Lord | F27D 3/18 164/337 |
| 3,634,065 | A | 1/1972 | Worner | |
| 3,837,791 | A | 9/1974 | Schoch et al. | |
| 4,359,209 | A | 11/1982 | Johns | |
| 4,457,777 | A | 7/1984 | MacGregor et al. | |
| 4,609,400 | A | 9/1986 | Vallomy | |
| 5,688,339 | A | 11/1997 | Farmer et al. | |
| 6,155,333 | A | 12/2000 | Vallomy | |
| 8,277,720 | B2 | 10/2012 | Axelsson et al. | |
| 2003/0061909 | A1 | 4/2003 | Negami et al. | |
| 2005/0077658 | A1 | 4/2005 | Zdolshek et al. | |
| 2007/0160948 | A1 | 7/2007 | Gartz | |
| 2013/0106033 | A1 | 5/2013 | Giavani et al. | |
| 2015/0218666 | A1 | 8/2015 | Nakagawa et al. | |

FOREIGN PATENT DOCUMENTS

| | | |
|---|---|---|
| EP | 1979495 | 7/2011 |
| EP | 2267171 | 1/2015 |
| WO | 0117910 | 3/2001 |
| WO | 2011126427 | 10/2011 |
| WO | 2014053657 | 4/2014 |

OTHER PUBLICATIONS

Baukal, C.E., et al, “Surface Condition Effects on Flame Impingement Heat Transfer”, Experimental Thermal and Fluid Science 15; 1997; 323-335; Elsevier Science Inc.

* cited by examiner

METHODS FOR PREHEATING METAL-CONTAINING PELLETS

CROSS-REFERENCE TO RELATED APPLICATIONS

This application is a divisional of U.S. application Ser. No. 16/025,230 filed Jul. 2, 2018 and claims priority from U.S. Provisional Application No. 62/531,019 filed Jul. 11, 2017 and U.S. Provisional Application No. 62/621,754 filed Jan. 25, 2018, each of which is incorporated by reference herein in its entirety.

BACKGROUND

To the best of the inventors' knowledge, reheating of direct reduced iron (DRI) or hot briquetted iron (HBI) is not currently practiced. However, DRI is sometimes produced onsite at the steel mill and transferred hot into an electric arc furnace (EAF) for melting. This practice has resulted in good electrical energy savings (and other operational benefits) in the EAF (20 kWh per ton of DRI charged for every 100° C. temperature increase). It may be possible to preheat DRI using conventional indirect combustion methodologies, but those would require large capital investments and wasteful energy practices. Additionally, longer exposure to uncontrolled combustion atmospheres can lead to unwanted oxidation of the DRI surface. The systems and methods described herein have the objective of overcoming the lower energy efficiencies in melting of DRI relative to preheated or hot-charged DRI/HBI.

Direct Reduced Iron (DRI) and/or Hot Briquetted Iron (HBI) are being increasingly used as the charge material into steel operations such as EAFs (and BOFs), in some cases as much as 30-50% of the charge. DRI or HBI are typically provided in a pelleted form which are sometimes referred to herein as metal-containing pellets.

DRI plants are also fast replacing traditional forms of iron ore processing such as blast furnaces because of higher usage of natural gas in DRI making process. Natural gas is preferred because it is a lower-carbon containing, more economically available fuel source compared to coal. DRI plants are usually located closer to mining operations and/or where natural gas is economical, and are not necessarily close to steel mill operations. As a result, a majority of the DRI produced today is transported cold to steel mills, before being stored and eventually charged cold into steel making operations.

SUMMARY

Aspect 1. A direct flame impingement system for preheating metal pellets before charging into a melting furnace, wherein the pellets are transported by a conveyor belt to a chute discharging into the melting furnace, comprising: a refractory-lined preheater hood including a chute hood covering the chute and a conveyor hood covering at least a portion of the conveyor belt, the preheater hood having an entrance end through which pellets enter and an exit end through which pellets exit toward the melting furnace; and at least one bank of burners each containing at least one burner disposed in the hood positioned to direct flames into contact with the pellets being transported to preheat the pellets prior to discharge into the melting furnace.

Aspect 2. The direct flame impingement system of Aspect 1, wherein the at least one bank of burners includes a chute bank of burners disposed in the chute hood containing at least one burner positioned to direct flames into contact with the pellets being transported through the chute.

Aspect 3. The direct flame impingement system of Aspect 1 or 2, wherein the at least one bank of burners includes a first conveyor bank of burners disposed in the conveyor hood containing at least one burner positioned to direct flames into contact with pellets being transported on a first section of the conveyor belt.

Aspect 4. The direct flame impingement system of Aspect 3, wherein the at least one bank of burners further includes a second conveyor bank of burners containing at least one burner disposed in the conveyor hood positioned to direct flames into contact with the pellets on a second section the conveyor belt.

Aspect 5. The direct flame impingement system of Aspect 4, wherein at any particular time, one of the first and second banks of conveyor burners is controlled to be fuel-rich so as to create a reducing zone and the other of the first and second banks of conveyor burners is controlled to be oxygen-rich so as to create an oxidizing zone; and wherein the reducing zone is near the exit end of the conveyor cover and the oxidizing zone is near the entrance end of the conveyor cover.

Aspect 6. The direct flame impingement system of any one of Aspects 1-5, further comprising a bank of inert fluid nozzles positioned along the conveyor cover for injecting inert fluid toward the conveyor to enable rapid cooling and/or fire suppression of the pellets, wherein the inert fluid is selected from the group consisting of an inert gas, an inert liquid, and a combination of an inert gas and an inert liquid.

Aspect 7. The direct flame impingement system of any one of claims Aspects 1-6, further comprising a flue at the entrance end of the preheater hood to induct hot flue gases to flow from the melting furnace, under the preheater hood and over the pellets in the chute and on the conveyor, to enhance convective heat transfer to the pellets.

Aspect 8. The direct flame impingement system of any one of Aspects 1-7, further comprising one or more ploughs along the conveyor belt to mix the pellets for enhanced contact of the flames with the pellets.

Aspect 9. The direct flame impingement system of any one of Aspects 1-8, wherein the burners combust fuel with one or more of air, oxygen-enriched air having greater than 23% molecular O2, and industrial-grade oxygen having at least 70% molecular O2.

Aspect 10. The direct flame impingement system of any one of Aspects 1-9, further comprising: at least one sensor to detect a process condition; and a controller programmed to operate the burners based on the process condition; wherein when the at least one sensor is a flue gas sensor positioned at the entrance end of the preheater hood to measure the concentration of one or more gases in the flue gas, the controller is programmed to adjust operation of the burners based on a measure concentration of one or more gases in the flue gas; wherein when the at least one sensor is a temperature sensor positioned in the conveyor hood for measuring one or more of gas temperature, pellet temperature, and belt temperature the controller is programmed to adjust operation of the burners based on one or more of a measured gas temperature, a measured pellet temperature, and a measured belt temperature; and wherein when the at least one sensor is configured and arranged to detect a safety condition, the controller is programmed to shut down the burners in the event a safety condition is detected.

Aspect 11. A method of preheating metal pellets upstream of a melting furnace, wherein the pellets transported by a conveyor belt and to a chute discharging into the melting furnace, comprising: operating at least one bank of burners each containing at least one burner to direct flames into contact with the pellets being transported to preheat the pellets prior to discharge into the melting furnace.

Aspect 12. A preheating system for preheating metal-containing pellets before charging into a melting furnace, comprising: a refractory-lined preheater furnace having an inlet end wall, an exit end wall opposite the inlet end wall, and a substantially cylindrical side wall defined by an axis of the furnace and extending from the inlet end wall to the exit end wall, the inlet end wall having a door or opening for receiving unheated pellets, the exit end wall having a door or opening for discharging heated pellets toward the melting furnace; at least one burner for firing into the preheater furnace to impart heat to the pellets; and a flue for exhausting combustion gases produced by the burner from the preheater furnace; wherein the preheater furnace rotatable and is arranged to rotate about its axis.

Aspect 13. The preheater system of Aspect 12, further comprising: a controller programmed to control operation of the at least one burner so as to produce a non-oxidizing atmosphere over the pellets to inhibit oxidation of the pellets.

Aspect 14. The preheater system of Aspect 12, further comprising a mechanism in the furnace configured and arranged urge the pellets to move from the inlet end to the exit end.

Aspect 15. A method for preheating metal pellets before charging into a melting furnace, wherein the pellets are transported by a conveyor belt to a chute and discharged from the chute into the melting furnace, the method comprising: heating the pellets by direct flame impingement from two or more banks of burners, wherein the two or more banks of burners comprise an upstream bank of burners and a downstream bank of burners; and controlling the upstream bank of burners to operate oxygen-rich so as to create an oxidizing zone and the downstream bank of burners to operate fuel-rich so as to create a reducing zone.

Aspect 16. The method of Aspect 15, wherein the two or more banks of burners comprise a conveyor bank of burners positioned to direct flames into contact with the pellets being transported by the conveyor belt and a chute bank of burners positioned to direct flames into contact with the pellets discharged from the chute into the melting furnace.

Aspect 17. The method of Aspect 15, further comprising contacting the pellets with an inert fluid selected from the group consisting of an inert gas, an inert liquid, and a combination of an inert gas and an inert liquid to enable at least one of cooling the pellets and fire suppression of the pellets.

Aspect 18. The method of Aspect 15, further comprising convectively heating the pellets by flowing a hot flue gas from the melting furnace over the pellets in a direction from the chute toward the conveyor.

Aspect 19. The method of Aspect 15, further comprising mixing the pellets using one or more ploughs on the conveyor belt.

Aspect 20. The method of Aspect 15, wherein the two or more banks of burners combust fuel with one or more of air, oxygen-enriched air having greater than 23% molecular O2, and industrial-grade oxygen having at least 70% molecular O2.

Aspect 21. The method of Aspect 15, further comprising: measuring at least one process condition; and controlling the two or more banks of burners based on the at least one process condition; wherein when the at least one process condition is a concentration of one or more gases in the hot flue gas, adjusting the two or more banks of burners based on the concentration of one or more gases in the hot flue gas; wherein when the at least one process condition is one or more temperatures selected from the list of the gas temperature, pellet temperature, or belt temperature, adjusting the two or more banks of burners based on the one or more temperatures; and wherein when the at least one process condition is a safety condition, shutting down the two or more banks of burners in the event the safety condition is detected.

A direct flame impingement system disclosed for preheating metal pellets before charging into a melting furnace, wherein the pellets transported by a conveyor belt to a chute discharging into the melting furnace, including a refractory-lined conveyor hood covering at least a portion of the conveyor belt, the conveyor hood having an entrance end through which pellets enter and an exit end through which pellets exit toward the chute; and a first bank of conveyor burners containing at least one burner disposed in the conveyor hood positioned to direct flames into contact with the pellets on a first section of the covered portion of the conveyor belt.

The direct flame impingement system may also include a flue connection at the entrance end of the conveyor hood to induct hot flue gases to flow from the melting furnace and preheating section over the unheated pellets, to enhance convective heat transfer to the pellets.

The direct flame impingement system may also include one or more ploughs along the conveyor belt to mix the pellets for enhanced contact of the flames with the pellets.

The direct flame impingement system may also include a refractory-lined chute hood covering the chute, and a bank of chute burners containing at least one burner disposed in the chute hood positioned to direct flames into contact with the pellets being discharged via the chute into the furnace.

The direct flame impingement system may also include a second bank of conveyor burners containing at least one burner disposed in the conveyor hood positioned to direct flames into contact with the pellets on a second section of the covered portion of the conveyor belt.

The direct flame impingement system may, at any particular time, be controlled such that one of the first and second banks of conveyor burners is fuel-rich so as to create a reducing zone and the other of the first and second banks of conveyor burners is oxygen-rich so as to create an oxidizing zone. The reducing zone is near the exit end of the conveyor cover and the oxidizing zone is near the entrance end of the conveyor cover.

In the direct flame impingement system, the burners may combust fuel with one or more of air, oxygen-enriched air having greater than 23% molecular O2, and industrial-grade oxygen having at least 70% molecular O2.

The direct flame impingement system may also include at least one flue gas sensor positioned in the conveyor hood for measuring the concentration of one or more gases in the flue gas.

The direct flame impingement system may also include at least one temperature or imaging sensor positioned in the conveyor hood for measuring one or more of gas temperature, pellet temperature, and belt temperature.

The direct flame impingement system may also include a controller programmed to operate the burners. The controller may be programmed to shut down the burners in the event of a conveyor belt failure, conveyor belt overheating, or other safety condition. The controller may also be programmed to adjust operation of the burners based on a measure concentration of one or more gases in the flue gas.

The controller may also be programmed to adjust operation of the burners based on one or more of a measured gas temperature, a measured pellet temperature, and a measured belt temperature.

The direct flame impingement system may also include a bank of inert fluid nozzles positioned along the conveyor cover for injecting inert fluid (gas, liquid, or combination thereof) toward the conveyor to enable rapid cooling and/or fire suppression of the pellets.

A method of preheating metal pellets upstream of a melting furnace is also disclosed, wherein the pellets transported by a conveyor belt and to a chute discharging into the melting furnace, including covering a first portion of the conveyor belt in a refractory-lined conveyor hood; and operating a first bank of conveyor burners containing at least one burner to direct flames into contact with the pellets on the first portion of the conveyor belt.

The method of preheating metal pellets may also include operating a bank of chute burners containing at least one burner to direct flames into contact with the pellets being discharged via the chute into the furnace.

The method of preheating metal pellets may also include covering a second portion of the conveyor belt in the refractory-lined conveyor hood; and operating second bank of conveyor burners containing at least one burner to direct flames into contact with the pellets on a second portion of the conveyor belt.

The method of preheating metal pellets, wherein at any particular time, firing one of the first and second banks of conveyor burners to create a heated zone and refraining from firing the other of the first and second banks of conveyor burners to create an unheated zone.

The method of preheating metal pellets, wherein at any particular time, controlling one of the first and second banks of conveyor burners to be fuel-rich to create a reducing zone and controlling the other of the first and second banks of conveyor burners to be oxygen-rich to create an oxidizing zone.

The method of preheating metal pellets may also include measuring the concentration of one or more gases in the conveyor hood.

The method of preheating metal pellets may also include measuring one or more of gas temperature, pellet temperature, and belt temperature in the conveyor hood.

The method of preheating metal pellets may also include shutting down the burners in the event of a conveyor belt failure, conveyor belt overheating, or other safety condition.

The method of preheating metal pellets may also include adjusting operation of the burners based on a measure concentration of one or more gases in the conveyor hood.

The method of preheating metal pellets may also include adjusting operation of the burners based on one or more of a measured gas temperature, a measured pellet temperature, and a measured belt temperature.

The method of preheating metal pellets may also include injecting inert gas and/or inert liquid toward the conveyor to enable rapid cooling and/or fire suppression of the pellets.

In another embodiment, a preheating system is disclosed for preheating metal-containing pellets before charging into a melting furnace, comprising: a refractory-lined preheater furnace having an inlet end wall, an exit end wall opposite the inlet end wall, and a substantially cylindrical side wall defined by an axis of the furnace and extending from the inlet end wall to the exit end wall, the inlet end wall having a door or opening for receiving unheated pellets, the exit end wall having a door or opening for discharging heated pellets toward the melting furnace; at least one burner for firing into the preheater furnace to impart heat to the pellets; and a flue for exhausting combustion gases produced by the burner from the preheater furnace.

In the preheating system, the preheater furnace may be rotatable and arranged to rotate about its axis.

In the preheating system, the at least one burner may be positioned in the inlet end wall of the preheater furnace. Alternative, the at least one burner may be positioned in the exit end wall of the preheater furnace. The flue may be positioned in the exit end wall of the furnace. Alternatively, the flue may be positioned in the inlet end wall of the furnace.

The preheater system may include a controller programmed to control operation of the at least one burner so as to produce a non-oxidizing atmosphere over the pellets to inhibit oxidation of the pellets.

In the preheating system, the at least one burner may comprise two burners each arranged to fire into a different section of the preheater furnace, and the controller may be programmed to control the relative firing rates and stoichiometries of the two burners to produce the non-oxidizing atmosphere.

The controller may be programmed to operate the burner at an equivalence ratio from 1 to 1.3 (i.e., fuel-rich, or having insufficient oxygen to fully combust the fuel).

The controller may be programmed to operate the at least one burner, wherein the controller is programmed to adjust operation of the at least one burner based on one or more of a measured gas temperature, a measured pellet temperature, a measured flue gas concentration, and another measured process parameter.

The preheater system may further include at least one baffle on at least a portion of the substantially cylindrical side wall to function urge the pellets to move from the inlet end to the exit end. The at least one baffle is a helical baffle may be configured to function as a screw conveyor.

The axis of the preheater furnace may be angled with respect to horizontal such that the inlet end is at least slightly higher than the exit end to encourage movement of the pellets from the inlet end to the exit end and to facilitate discharge of the pellets from the exit end.

The preheater furnace may be arranged to be tilted so that the axis is at any angle from horizontal to vertical.

The at least one burner in the preheater may be an oxy-fuel burner operated with an oxidant having one or more of oxygen-enriched air having greater than 23% molecular O2 and industrial-grade oxygen having at least 70% molecular O2.

Another embodiment of a method is disclosed for preheating metal-containing pellets upstream of a melting furnace, comprising: charging unheated pellets into an inlet end of refractory-lined preheater furnace; heating the pellets by: firing at least one burner into the preheater furnace to impart heat to the pellets; exhausting combustion gases produced by the at least one burner from the preheater furnace; and discharging heated pellets from an exit end of the preheater furnace, wherein the exit end is opposite the inlet end.

The method of preheating metal-containing pellets, wherein the preheater furnace has a substantially cylindrical side wall defined by an axis of the furnace and being bounded by an inlet wall at the inlet end and an exit wall at the exit end, may also include rotating the preheater furnace about its axis to enhance mixing of the pellets and heat transfer from the side wall to the pellets.

The method may be operated in a batch mode by: first charging an amount of the unheated pellets into the inlet end of the preheater furnace; after charging, then heating the pellets until a predetermined condition is attained; and after heating, then discharging the amount of heated pellets from the exit end of the preheater furnace; wherein the predetermined condition is defined by one or more of an elapsed amount of time, a temperature, or another measured or predetermined process parameter.

The method may be operated in a semi-continuous mode by: simultaneously charging unheated pellets into inlet end of the preheater furnace at a feed rate, heating the pellets, and discharging heated pellets from the preheater furnace at a discharge rate; and continuously causing the pellets to move from the inlet end toward the exit end during the simultaneous charging, heating, and discharging; wherein the feed rate is at least as great as the discharge rate, except in the event of a disruption of the charging of unheated pellets; and wherein one of more of the actions of charging and discharging in the simultaneously charging step may be occasionally disrupted.

The method may also include causing the pellets to move by inclining the axis of the preheater furnace downward from the inlet end to the exit end while rotating the preheater furnace about its axis.

The method may also include causing the pellets to move by contacting the pellets with at least one baffle on the substantially cylindrical side wall while rotating the preheater furnace about its axis.

The method may also include causing the pellets to move by contacting the pellets with a screw conveyor positioned within the preheater furnace.

The method may also include firing the burner with a slightly fuel-rich equivalence ratio ranging from 1 to 1.3 to inhibit oxidation of the pellets.

The method may also include firing the burner from the inlet end of the preheater furnace and exhausting the combustion gases from the exit end of the furnace.

The method may also include firing the burner from the inlet end of the preheater furnace and exhausting the combustion gases from the inlet end of the furnace.

The method may also include firing the burner from the exit end of the preheater furnace and exhausting the combustion gases from the exit end of the furnace.

The method may also include firing the burner from the exit end of the preheater furnace and exhausting the combustion gases from the inlet end of the furnace.

The method may also include operating the at least one burner with an oxidant having one or more of oxygen-enriched air having greater than 23% molecular $O_2$ and industrial-grade oxygen having at least 70% molecular $O_2$.

The method may also include controlling operation of the at least one burner based on one or more of a measured gas temperature, a measured pellet temperature, a measured flue gas concentration, and another measured process parameter.

BRIEF DESCRIPTION OF THE DRAWINGS

The present invention will hereinafter be described in conjunction with the appended figures wherein like numerals denote like elements.

DETAILED DESCRIPTION

The present inventors propose a system and method of preheating the cold DRI/HBI as it is being transported or conveyed from (local) storage at a steel mill to be charged into steel operations such as EAFs (and other relevant processes). Use of a preheater furnace, and preferably a rotary type preheater furnace, is expected to provide higher heat transfer efficiency and reduced firing rate requirements (due to increased residence time) as compared to inline heating.

Two important factors when heating DRI are heat transfer efficiency and atmosphere control to avoid oxidation of the pellets.

Direct Reduced Iron (DRI) and/or Hot Briquetted Iron (HBI) are being increasingly used as the charge material into steel operations such as EAFs (and BOFs), in some cases as much as 30-50% of the charge. DRI plants are also fast replacing traditional forms of iron ore processing such as blast furnaces because of higher usage of natural gas in DRI making process. Natural gas is preferred because it is a lower-carbon containing, more economically available fuel source compared to coal. DRI plants are usually located closer to mining operations and not close to steel mill operations. As a result, a majority of the DRI produced today is transported cold to steel mills, before being stored and eventually charged cold into steel making operations.

The present inventors propose a system and method of preheating the cold DRI/HBI as it is being transported or conveyed from (local) storage at a steel mill to be charged into steel operations such as EAFs (and other relevant processes). Use of direct flame impingement (DFI) is expected to be relatively less capitally intensive and less wasteful in energy practices. The time required to increase the temperature of the pellets can be optimized using firing rate modulations, engaging and disengaging different banks of burners; so as to heat the pellets in shortest amount of time possible to reduce any oxidation. As used herein, the terms "pellets" and "metal pellets" are understood to include DRI pellets as well as HBI briquettes or metal-containing granules or other unitized elements of metal-containing materials.

Figure 1:
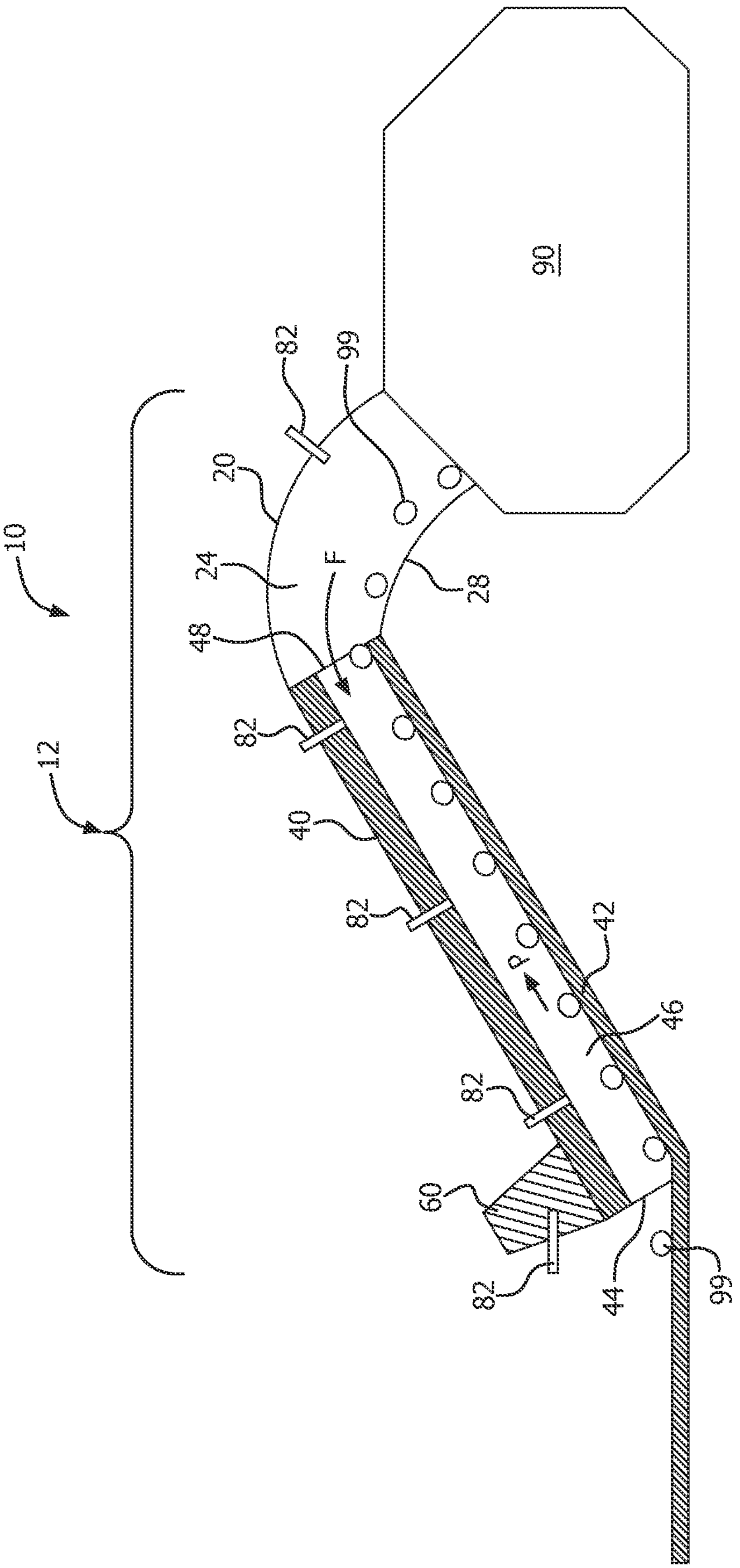
FIG. 1 is a schematic side view showing an arrangement of a system for charging metal pellets into a furnace including a preheater.

An arrangement for a DRI preheater system 10 is shown in FIG. 1, and various specific embodiments of the arrangement are shown in FIGS. 2-4 and 7-8 (discussed in detail below). A conveyor belt 42 transports pelleted metal-containing materials 99 from a storage location (not shown) and then down a chute 28 into a melting furnace 90. The conveyor belt 42 may be flat or sloped upward toward the chute 28, but typically includes an upward sloped portion 43 that feeds the chute 48. A refractory-lined chute hood 20 positioned above the chute 28 partially or completely covers the chute 28. The chute 28 itself may also be refractory-lined to aid in resisting the heat of combustion generated by the melting furnace 90 and the preheater system 10. The chute 28 and chute hood 20 together form a passage 24 that serves to exhaust some of the hot flue gases from the melting furnace 90.

A preheater 12 is configured to provide combustion heating to the pellets 99 before the pellets 99 are charged into the furnace 90. As shown in FIGS. 2-4 and 7-8, the preheater 12 includes both the chute hood 20 and a refractory-lined conveyor hood 40. The conveyor hood 40 is positioned above the conveyor 42 and partially or fully covers at least a lengthwise portion of the conveyor 42. The conveyor 42 and conveyor hood 40 together form a passage 46 for the exhaust gases that leave the melting furnace 90 and flow through the passage 24 formed by the chute 28 and chute hood 20.

For reference purposes, the orientation of the conveyor 42, conveyor hood 40, and/or passage 46 may be described as having an entrance end 44 where the pellets 99 enter and an exit end 48 where the pellets 99 exit to the chute 28. A flow P of the pellets 99 moves from the entrance end 44 to the exit end 48, while a flow F of gaseous exhaust or combustion products moves in generally the opposite direction, from the exit end 48 toward the entrance end 44.

A flue duct 60 is located at or near the entrance end 44 of the conveyor hood 40 to exhaust combustion products (flue gases) either out of the building, toward the canopy, or elsewhere as determined by local requirements.

One or more banks 50 of burners 52 are housed at one or more locations in the chute hood 20 and/or the conveyor hood 40. The burners 52 in each bank 50 are positioned strategically along the length and width of the conveyer 42 and emits a flame 54 that impinges the pellets 99. Additionally, the hoods 20 and 40 will be heated by the burners 52 and radiation from the hoods 20 and 40 will assist efficient heating.

The preheater 12 utilizes hot flue gases F flowing in a direction that is countercurrent with respect to a direction of the flow P of pellets 99, thereby assisting with preheating in the same manner as a counterflow heat exchanger.

Preferably, the preheater 12 is lined with special refractory coatings to reflect and re-radiate energy back to the pellets 99.

The pellets 99 may be mixed by positioning one or more ploughs (not shown) or other mechanism for bringing pellets from the bottom to the top along the length of the belt so that heat may be able to contact all pellets.

The DFI burners 52 can use oxidizers from 20.9% (all air) to 100% (all oxygen) oxygen-content-in-oxidizer and any fuel including natural gas, propane, COG, BFG, or the like. Preferably, the burners are oxy-fuel burners that use an oxidant having at least 23% molecular O2, more preferable at least 30% molecular O2, and still more preferably industrial-grade oxygen having at least 70% molecular O2.

The DFI burners 52, positioned along the length of a portion or entirety of conveyor belt 42 or over multiple belts for heating (cold or warm) DRI pellets to be charged continuously into any process including a melting furnace 90 such as an electric arc furnace. The DFI burner position, height from the conveyor belt, spacing, angle relative to vertical, flame shape, number of and intensity may be adjusted based on pellet density (e.g., pellet depth, width, height), type of pellet, and speed of the conveyor belt. Belt material and shape may be modified to accommodate burner. Preferably a high temperature belt material is used. Preferably a belt type that enables maximum surface exposure of DRI pellets to the heat is used, e.g., a belt that provides for a shallow and broad distribution of the pellets.

Figure 2:
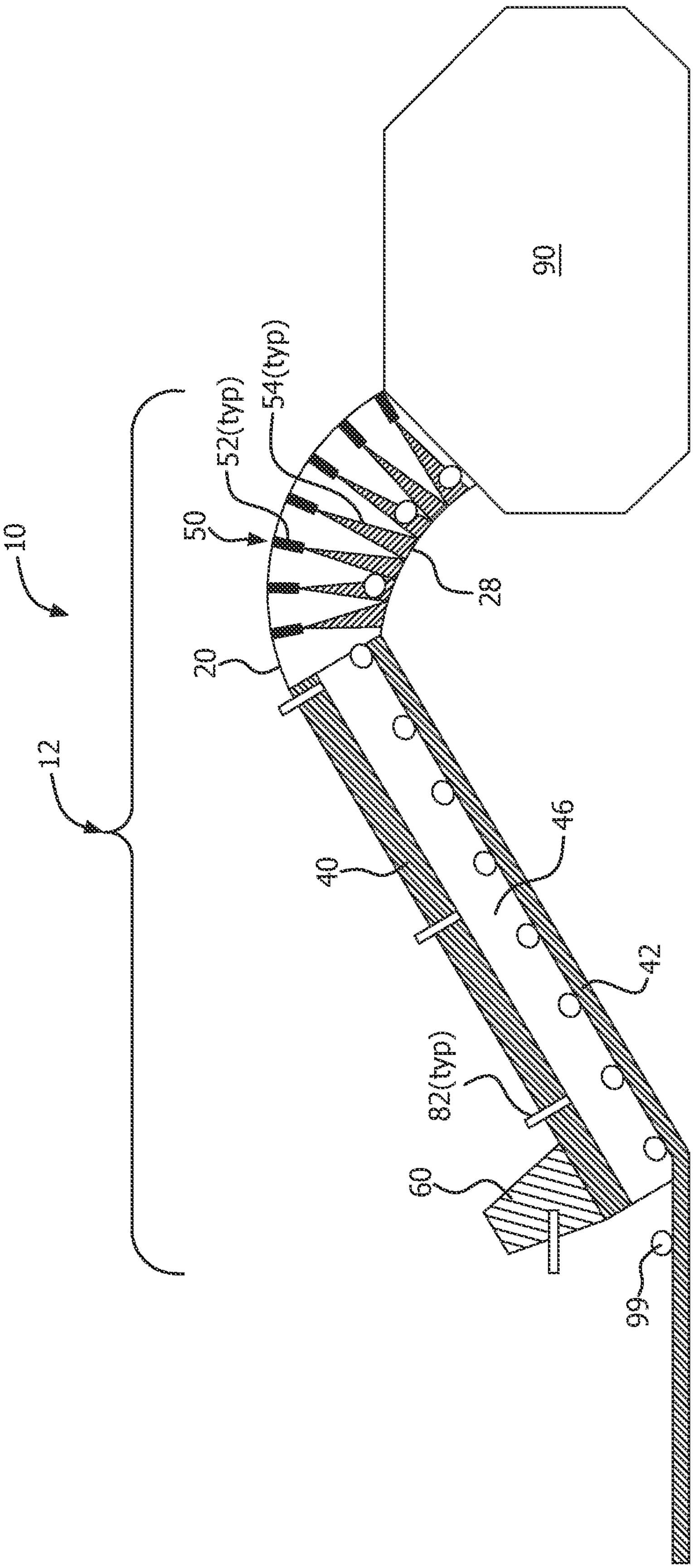
FIG. 2 is a schematic side view of an embodiment of a preheating system showing a fully covered refractory hood preheater using strategically positioned direct flame impingement (DFI) burners over the chute only.

Various embodiments of the preheater 12 are shown in FIGS. 2-6. In the embodiment of FIG. 2, a burner bank 50 including at least one burner 52, and preferably a plurality of burners 52, is positioned in the chute hood 20 over the chute 28. Just prior to dropping the heated DRI pellets into the desired process (e.g., melting furnace 90), the pellets 90 tumble through the flames 54 emanating from the burners 52. The embodiments of FIGS. 3-6 also use a bank 50 of burners 52 in the chute hood 2. This configuration enables individual and intimate contact between the flames 54 and each pellet 99 for enhancement of preheating.

Limiting a zone of direct combustion heating to the chute 28 that carries the pellets 99 from conveyor 42 to the melting furnace 90, alleviates the need for an expensive high temperature conveyor belt and any damage that may be caused by interaction of flames and hot combustion products with the belt. The burners 42 in the chute hood 20 can be configured to deliver intense heat, enabling a high heat-up rate of the pellets 99 so that the pellets 99 can take on significant heat in the chute 28 just before they fall into the melting furnace 90. Additionally, hot combustion products from the burners 52 in the chute hood 29 are routed upstream through the conveyor hood 40, over at least a portion of the conveyor 42 and the pellets 99 being transported toward the chute 28, so as to transfer some of the residual heat in those combustion products to the pellets 99 before they reach the chute 28. And if the chute 40 is lined with refractory as described herein, that refractory can help capture most of the heat from the burners 52 and reradiate some of that heat onto the pellets 99 while also preventing any damage to the surrounding structure.

In some embodiments, it may be beneficial to use a combination of fired zones and non-fired zones to control rate of preheating. Non-fired zones can be accomplished either by the absence of burners 52 or can be accomplished periodically as needed by selectively turning on and off banks 50 of burners 52 or even individual burners 52.

Figure 3:
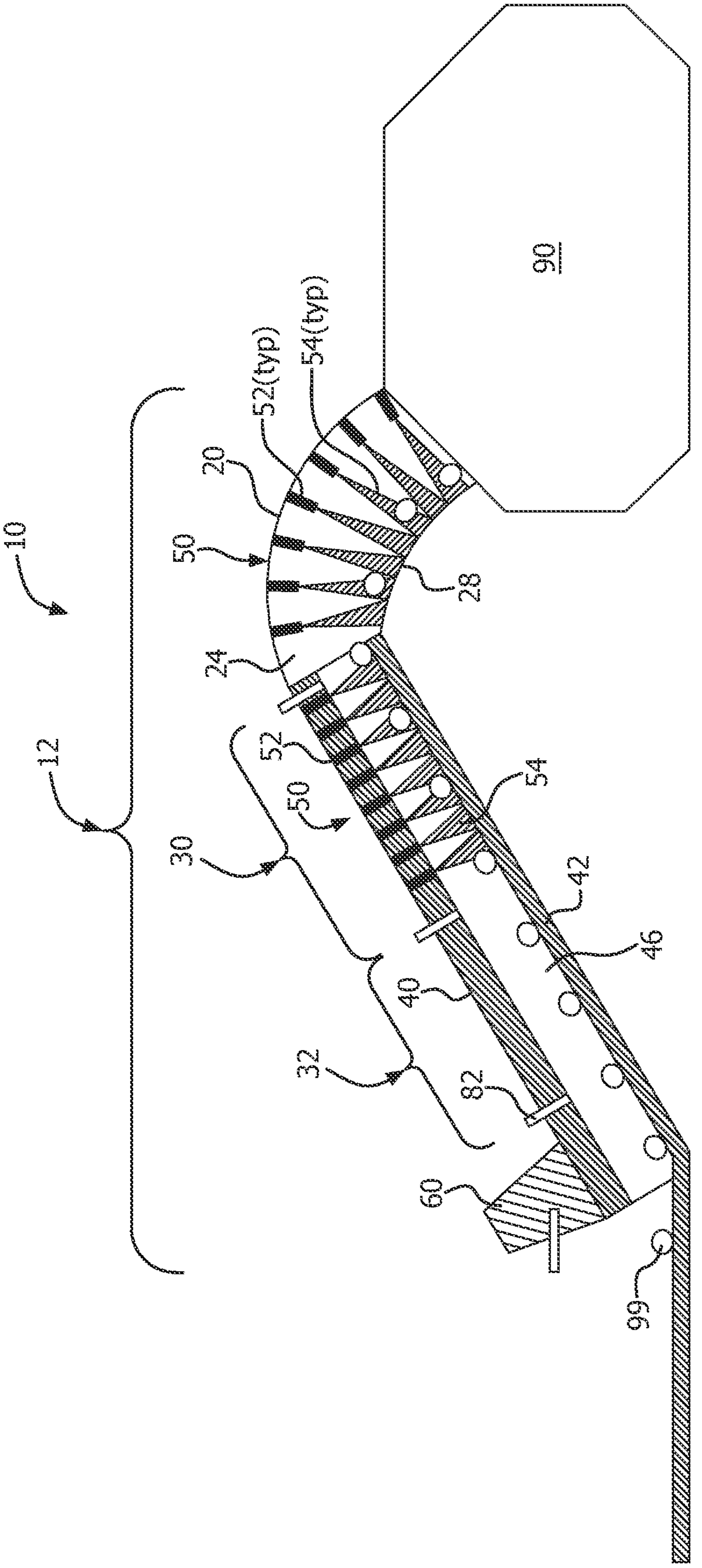
FIG. 3 is a schematic side view of an embodiment of a preheating system showing a fully covered refractory hood preheater using strategically positioned DFI burners over the chute and the conveyor (including heated and unheated zones).
Figure 4:
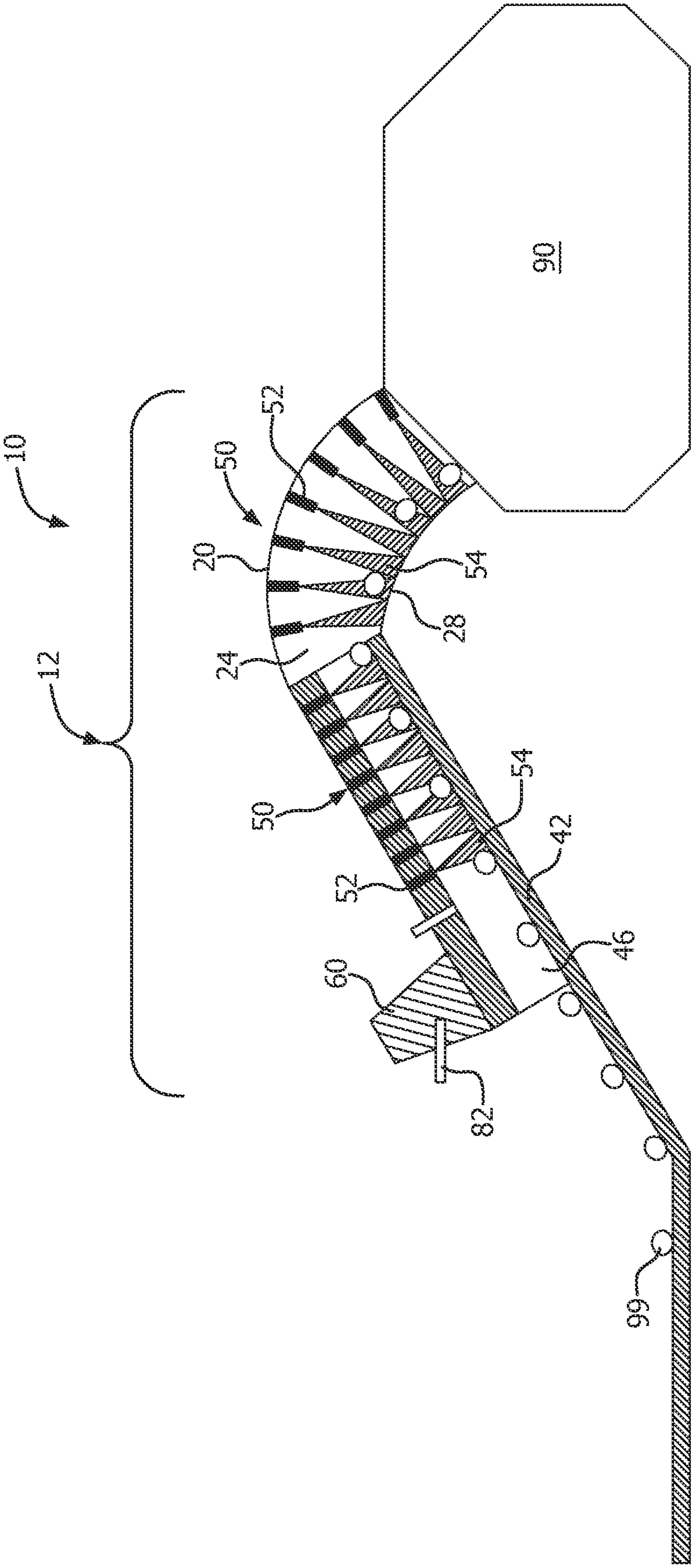
FIG. 4 is a schematic side view of an embodiment of a preheating system showing a partially covered refractory hood preheater using strategically positioned DFI burners over the chute and a portion of the conveyor.

In the embodiment of FIG. 3, a burner bank 50 is positioned in the chute hood 20 as in the embodiment of FIG. 2, and in addition, another burner bank 50 is positioned in a downstream portion 30 of the conveyor hood 40, while an upstream portion 32 of the conveyor hood 40 is devoid of a burner bank 50 (or has a burner bank 50 that is turned off. Thus, the bank 50 of burners 52 in the downstream portion 30 forms a heated zone, while the absence of a burners 52 in the upstream portion 32 forms an unheated zone. In the embodiment of FIG. 4, the conveyor hood 40 can be shortened to only cover an upstream portion of the conveyor 42, with a burner bank 50 in the conveyor hood, so that only the covered portion becomes a heated zone. As used herein, the terms "upstream" and "downstream" are with reference to the flow P of pellets 99.

DRI and other metal-containing pellets 99 may be prone to oxidization, so in some embodiments it may be beneficial to create fuel-rich and/or oxygen-rich zones along the length of the preheating furnace.

Figure 5:
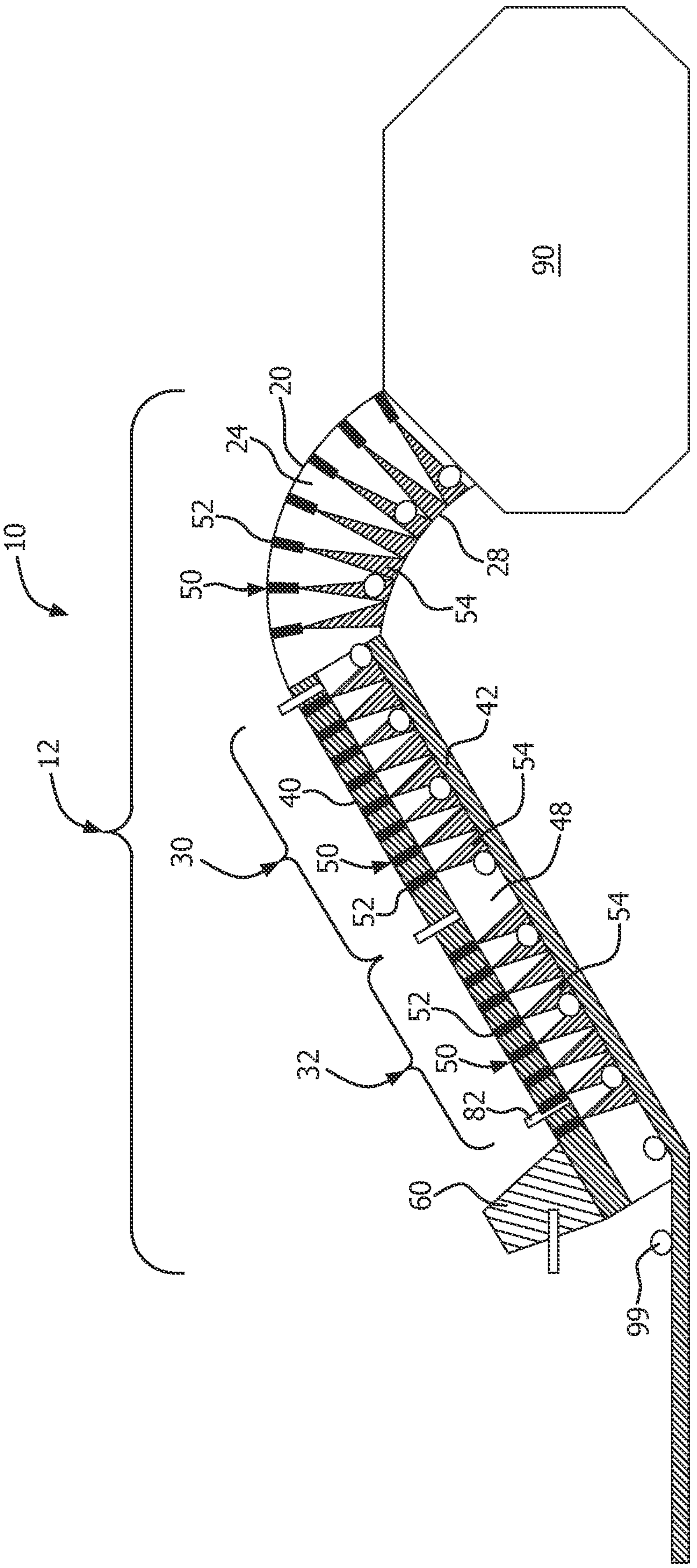
FIG. 5 is a schematic side view of an embodiment of a preheating system showing a fully covered refractory hood preheater using strategically positioned DFI burners to create oxygen-rich and fuel-rich zones over the conveyor.

In the embodiment of FIG. 5, in addition to a burner bank 50 in the chute hood 20 and a burner bank 50 in the downstream portion 30 of the conveyor hood 40, a further burner bank 50 is positioned in the upstream portion 32 of the conveyor hood 40. With this arrangement, the preheater 12 can be configured and operated such that the burner bank 50 in the upstream portion 32 farther from the furnace 90 operates oxygen-rich (i.e., more oxygen than is stoichiometrically necessary to full combustion the fuel) so as to create an oxygen-rich or oxidizing zone, while the burner bank 50 in the downstream portion 30 nearer the furnace 90 operates fuel-rich (i.e., with insufficient oxygen to fully combust the fuel) so as to create a fuel-rich or reducing zone.

Figure 6:
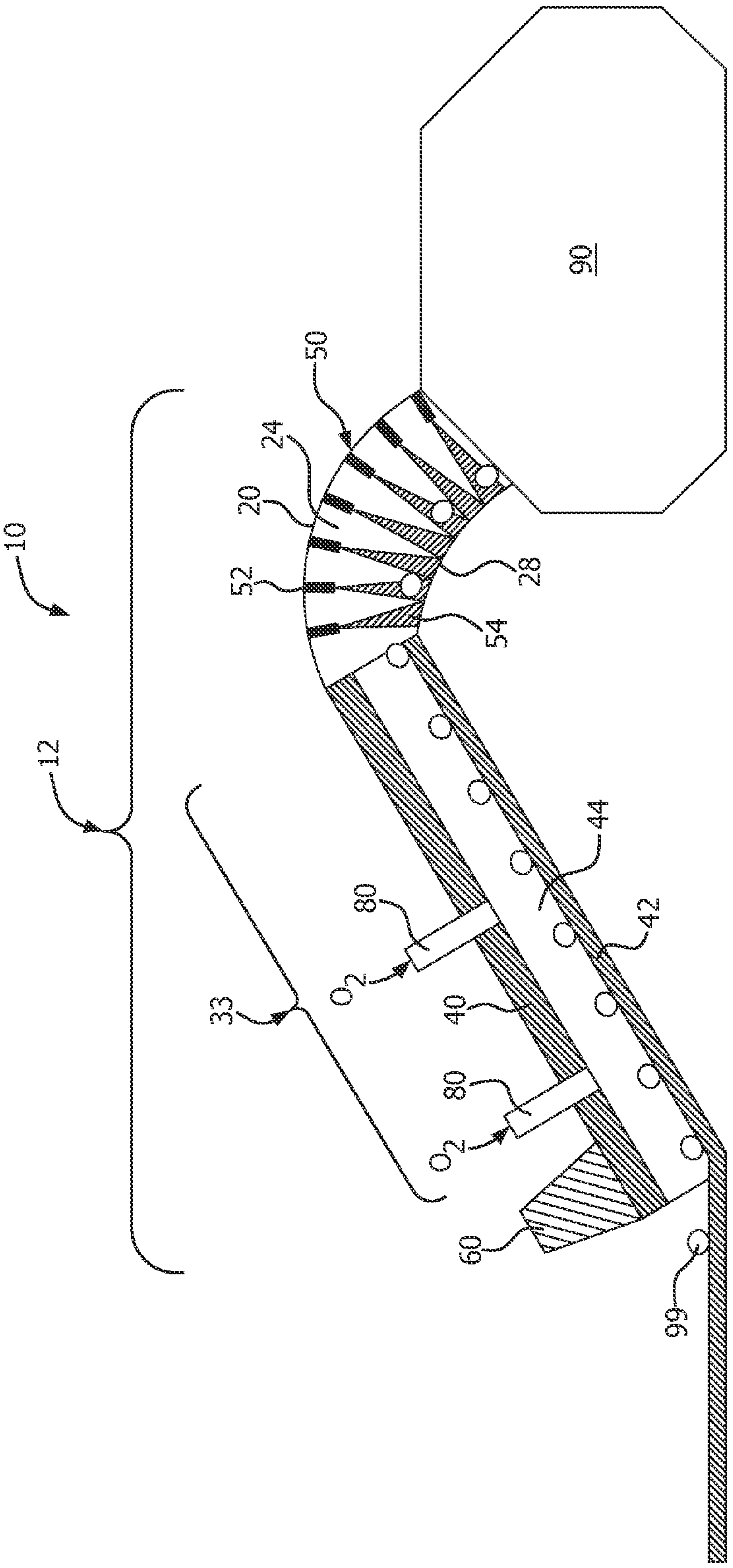
FIG. 6 is a schematic side view of an embodiment of a preheater system showing a fully covered refractory hood preheater using strategically positioned DFI burners in the chute only, with oxidizing and reducing zones.

Similarly, in the embodiment of FIG. 6, oxygen lances 84 can be used to create an oxygen-rich or oxidizing zone 33 over the conveyor 42 farther upstream from furnace 90, while a burner bank 50 in the chute hood 20 (or in a conveyor hood 40 nearer the furnace, not shown) can be operated fuel-rich to create a fuel-rich or reducing zone in the chute 20.

A benefit of a downstream fuel-rich zone as the pellets 99 increase in temperature is that exposing the pellets 99 to a reducing environment will reduce decarburization and protecting the pellets 99 from oxidation (FeO, $Fe_3O_4$, $Fe_2O_3$ and the like). A benefit of an upstream oxygen-rich zone closer to the combustion products exhaust where the pellets 99 are cooler is that the oxidizing environment can consume undesired CO and extract additional energy release from the combustion process prior to exhaust.

Operation of the burner banks 50 and individual burners 52, including such parameters as firing rate, number of burners operating and sequence of firing, and stoichiometry of the burners, is controlled based on requirement to achieve a target average heat content/temperature of the pellets 99 being charged into the furnace 90. Strategically located sensors 82 in the preheater 12, in conjunction with a controller (not shown) can be used to facilitate this control.

For example, the sensors 82 may be or may include composition sensors to measure composition of combustion products or flue gases along the length of the conveyor hood 40 and at the exit of the preheater 19 (i.e., at the flue duct 60) to modify and control operation of the burner banks 50 to create of desired atmospheres in different zones. In addition, or alternatively, the sensors 82 may be or may include temperature and imaging sensors (at the same or different locations as the composition sensors 82) can be used to measure temperature along the length of the conveyor hood 40 and at the flue duct 60 to control the energy input rates from the various burner banks 50.

Figure 7:
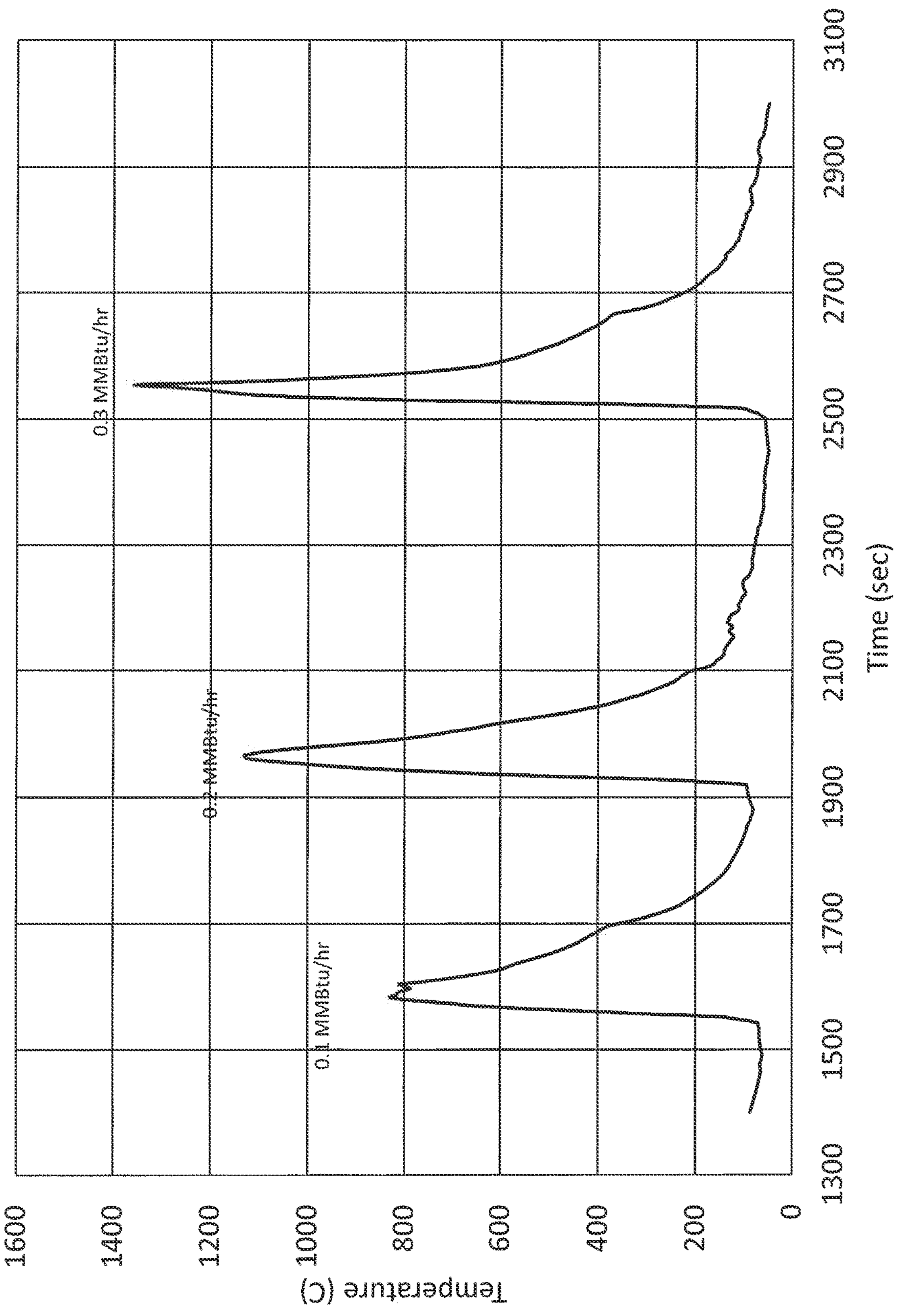
FIG. 7 is a graph showing pellet temperature vs. time when put under DFI burner at different firing rates.

FIG. 7 shows increase in temperature of a pellet with time for three different firing rates. It is observed that the slope of the curve becomes more steep with increasing firing rate suggesting increase in heat-up rate.

Figure 8:
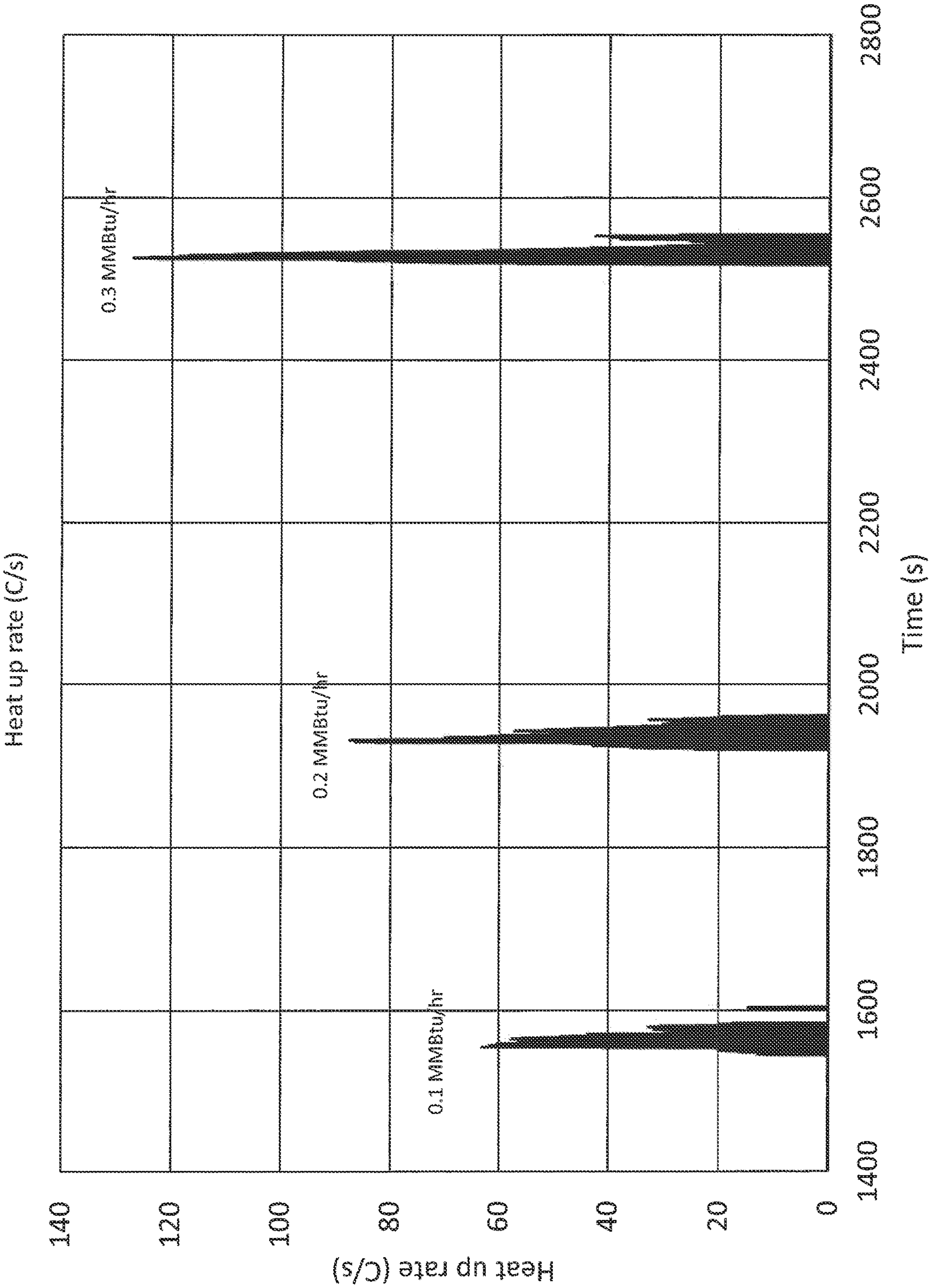
FIG. 8 is a graph showing pellet heat up rate vs. time when put under DFI burner at different firing rates.

FIG. 8 shows heat-up rate as a function of different firing rates. When the firing rate is increased by 3 times the heat up rate is increased by ~2 times. Thus, DFI burners can be used to heat the pellets in very short durations (e.g., approximately 8-10 seconds.)

The burner banks 50 or individual burners 52 can be shut down instantaneously should the conveyor belt 42 fail or for other safety critical reasons. Additionally, an emergency inert cooling system (using an inert gas as nitrogen or argon and/or an inert liquid such as liquid nitrogen or liquid argon) can be installed along the length of the conveyor hood 40 and in-between the burners 52 should quick cooling of the pellets 99 be necessary (for example, if there is a belt stoppage), to alleviate the risk of fire or harm to equipment.

Figure 9:
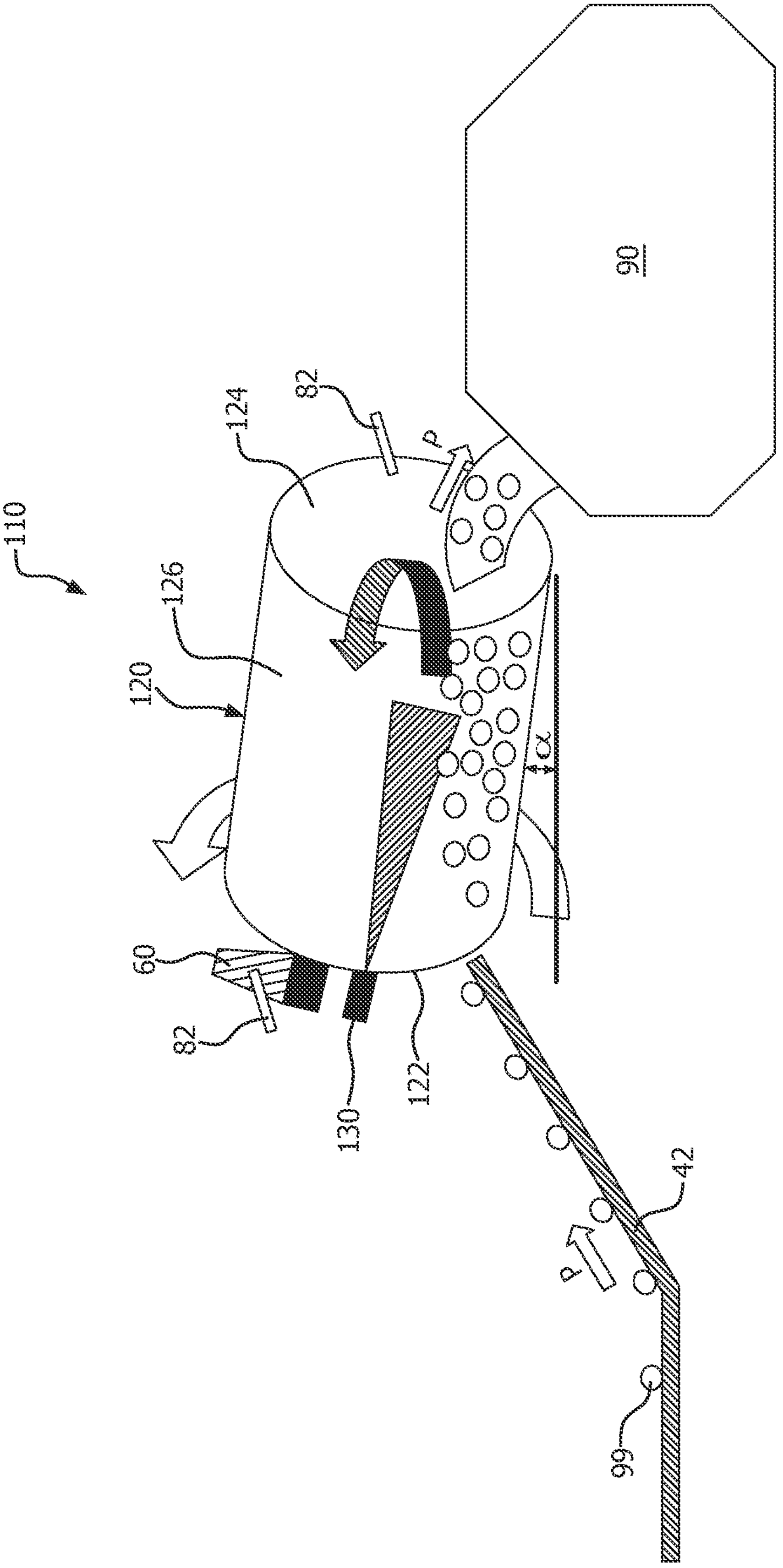
FIG. 9 is a schematic side view showing a first arrangement of a system with a rotary furnace configured for DRI preheating.
Figure 10:
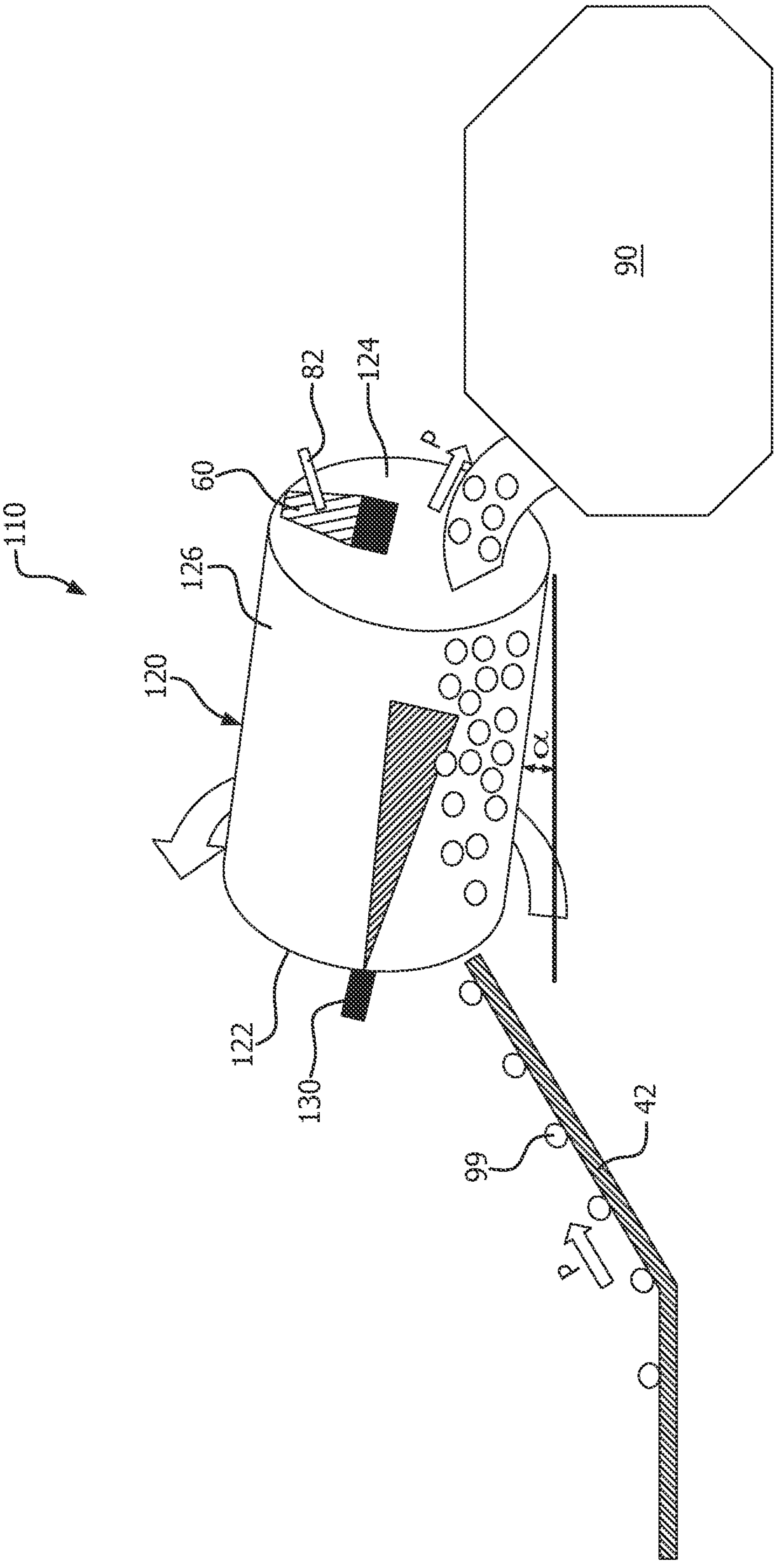
FIG. 10 is a schematic side view showing a second arrangement of a system with a rotary furnace configured for DRI preheating.
Figure 11:
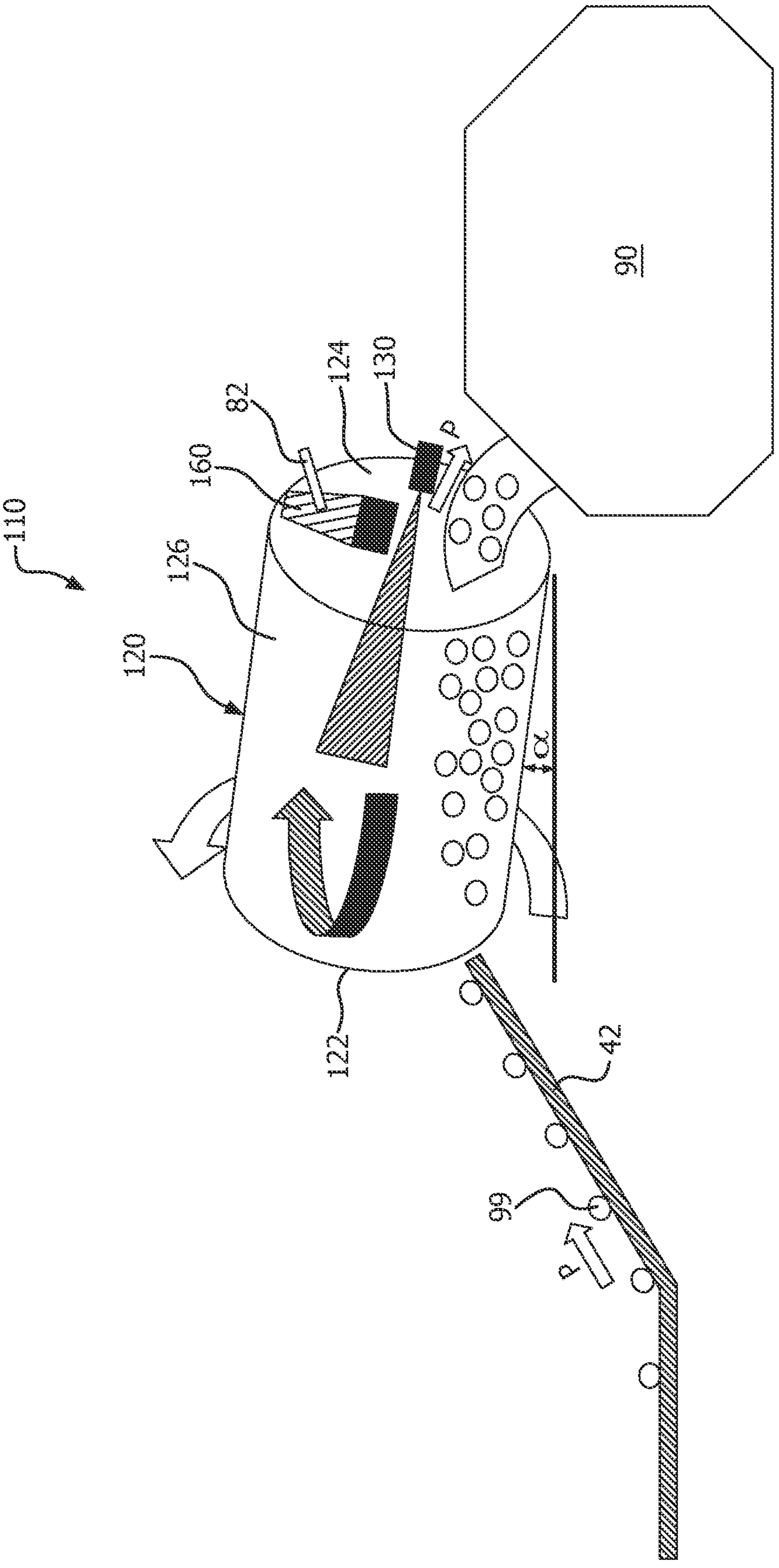
FIG. 11 is a schematic side view showing a third arrangement of a system with a rotary furnace configured for DRI preheating.

Various other arrangements of a DRI preheater 110 are shown in FIGS. 9-11. Each arrangement has some common elements or features.

In the depicted embodiments of FIGS. 9-11, a conveyor transports pelleted DRI/HBI (or other metal-containing pellets) from a storage location (not shown) up a ramped portion and into a preheater furnace. It is understood that any other known supply apparatus for transporting the pellets may be used, such as a hopper or vessel moved by an overhead crane. In the preheater furnace, a burner, or in some cases multiple burners, are fired to provide heating of the pellets, and a flue exhaust combustion products of the burner or burners from the furnace. From the preheater furnace, preheated DRI pellets are supplied to a melting furnace (such as an electric arc furnace or EAF).

As shown in FIGS. 9-11, the preheater furnace 120 is a refractory-lined substantially cylindrical furnace defined by an axis (extending lengthwise) and having two end walls 122 and 124, each end wall having an opening or door through at least a portion thereof. An inlet end wall 122 corresponds to the end of the furnace through which the DRI pellets 99 enter the furnace 120, and an exit end wall 124 corresponds to the end of the furnace 120 through which the DRI pellets exit the preheating furnace 120. The inlet wall 122 is opposite the exit wall 124. A substantially cylindrical side wall 126 joins the inlet end wall 122 and the exit end wall 124, and a central axis is defined by the cylindrical side wall 126. The preheater furnace 120 is mounted so that it can be rotated on its axis. Preferably, the speed of rotation can be controlled. Preferably, the preheater furnace 120 is lined with one or more special refractory coatings to reflect and re-radiate energy back to the DRI pellets 99. Flue gases will be directed either out of the building, toward the canopy, or elsewhere as determined by local requirements.

Preheating the DRI pellets requires at least one burner 130 to supply heat to the furnace 120 and at least one flue 160 to exhaust combustion products from the furnace 120.

In a first embodiment (FIG. 9), at least one burner 130 is mounted in the inlet end wall 122 of the furnace 120 and a flue 160 is mounted in the exit end wall 124 of the furnace 120; this embodiment results in a single-pass co-flow arrangement.

Alternatively, in a second embodiment (FIG. 10), at least one burner 130 is mounted in the exit end wall 124 of the furnace 120, and a flue 160 is also mounted in the exit end wall 124; this embodiment results in a double-pass arrangement that is initially counter-flow.

Alternatively, in a third embodiment (FIG. 11), at least one burner 130 is mounted in the inlet end wall 122 of the furnace 120, and a flue 160 is also mounted in the inlet end wall 122; this embodiment results in a double-pass arrangement that is initially co-flow.

In a fourth embodiment (not shown), at least one burner 130 is mounted in the exit end wall 124 of the furnace 120 and a flue 160 is mounted in the inlet end wall 122 of the furnace 120; this embodiment results in a single-pass counter-flow arrangement.

The pellets 99 on the moving conveyor 42 are inputted into the preheater furnace 120 through an opening in the inlet end 122 or door of the furnace 120 and discharged from the preheater furnace 120 through an opening in the exit end 124 or door. The process can operate in a batch mode or semi-continuous mode. The term "semi-continuous" is used to denote: (i) a mode that could be operated continuously, in which the feed rate through the inlet end is nominally equal to the discharge rate through the exit end, for an indefinite period of time, or for as long as necessary to charge the melting furnace; and/or (ii) a mode in which there are disruptions of flow at one end or the other, and in which the preheater furnace serves as a buffer to either accumulate pellets (e.g., when the inlet feed cannot be stopped but the melting furnace is not capable of immediately receiving heated pellets) or disperse pellets (e.g., when the inlet feed is stopped, whether by plan or unintentionally, and it is desired to continue charging the melting furnace). In this way, a preheater furnace is superior to merely heating on a continuous conveyor due to the added buffering capacity.

In a batch mode, a predetermined amount of pellets are loaded in the preheater furnace (e.g., by mass or volume or quantity of pellets) and are heated for a period of time, or until a desired average pellet temperature is reached, or until some other parameter or criteria is attained, and then the pellets are discharged as a batch into the melting furnace. The pellets can be heated to any desired temperature that is less than their melting temperature.

In a semi-continuous operation, pellets are loaded from the moving conveyor into the preheater furnace at a feed rate and are heated as they move axially through the preheater furnace. Heated pellets are discharged from the preheater furnace at a discharge rate into the melting furnace. The feed rate of the pellets is at least as large as the discharge rate, and preferably the feed rate is somewhat greater than discharge rate so as to ensure a sufficient residence time of the pellets in the preheater furnace and to ensure a substantially continuous stream of pellets being discharged from the furnace. There is expected to be a rough correlation of the feed rate and the discharge rate such that adjusting the feed rate will, with a time lag, cause a resultant adjustment in the discharge rate. In the semi-continuous operation mode, the pellets are contained in the furnace for a residence time on the order of minutes. Particularly in the semi-continuous mode, the exit opening through which pellets are discharged from the preheater furnace into the melting furnace is preferably located at the opposite end of the preheater furnace from the inlet opening through which pellets are fed into the preheater furnace The at least one burner and the inlet opening can be located on the same end or on opposite ends of the preheater furnace.

The pellets are mixed thoroughly by the rotating motion of the furnace. In addition, a screw conveyor arrangement could be placed inside the furnace to efficiently mix the pellets and to ensure substantially uniform exposure of the pellets to the radiation and hot combustion gases produced by the at least one burner. Alternatively, or in addition, at least one baffle may be positioned on at least a portion of the substantially cylindrical side wall to function to urge the pellets to move from the inlet end to the exit end. In one embodiment, the at least one baffle is a helical baffle configured to function as a screw conveyor on the interior of the preheater furnace side wall. In addition to or separately from the at least one baffle, a screw conveyor may be positioned within the preheater furnace for urging or compelling the pellets to move from the inlet end to the exit end.

Alternatively, or in addition to a screw conveyor or baffles, the preheater furnace may be a tilted furnace or capable of tilting to help better contain the charge material while batch process as well as accomplishing input and discharge of pellets. The preheater furnace may be mounted at a fixed angle $\alpha$ with respect to horizontal, with the inlet end higher than the exit end. In addition, or alternative, the preheater furnace may be pivotable so that it can move to any angle $\alpha$ from horizontal to near vertical during charging, heating, and/or discharging, as required by the process. For a batch process, the inlet and outlet can be through the same end of the furnace and tilting can be used to facilitate both holding the pellets in the furnace and discharge. For a continuous process, the inlet and exit are preferably at opposite ends, but a modest tilt angle $\alpha$ through the operation can still assist in both retaining pellets and encouraging a flow from feed to discharge.

A controller may be used to operate the at least one burner, for example to control the heating profile in the furnace, the atmosphere in the furnace, and/or the discharge temperature of the pellets. In some embodiments, a single burner is utilized. In other embodiments, two or more burners are used in order to control the amount of heat provided to one or more zones or regions in the furnace.

The burner firing rate and residence time in preheater furnace can be controlled based on requirement to achieve an aim average heat content/temperature of the charged pellets using sensors in the preheater furnace. Further, as noted above, the preheater furnace can serve as a buffer so that pellets an continue to be fed into the melting furnace for a period of time even if is a stoppage of the input conveyor belt.

In some embodiments, it may be beneficial to modulate the firing rate of the burner to control the preheating temperature if needed.

DRI pellets tend to oxidize, so in some embodiments it may be beneficial to control the atmosphere in the furnace to be slightly fuel rich (an equivalence ratio of 1 to 1.3, or preferably an equivalence ratio of 1 to 1.1). Equivalence ratio indicates the amount of fuel provided as compared with the amount of fuel that would be completely combusted to $CO_2$ and $H_2O$ by the available oxygen). A skilled person would understand that equivalence ratio is the inverse of stoichiometry, wherein stoichiometric combustion uses the theoretical amount of oxygen required to completely combust the fuel, super-stoichiometric or fuel-lean (equivalence ratio less than 1) uses excess oxygen, and sub-stoichiometric or fuel-rich (equivalence ratio greater than 1) uses insufficient oxygen. In addition, flue gas sensors could be used to measure composition of flue gases along the length and at the exit of the preheater to modify and control the generation of desired atmospheres. In addition, or alternatively, temperature and imaging sensors could be used to measure temperature along the length and at the exit of the preheater to control the energy input.

While the principles of the invention have been described above in connection with preferred embodiments, it is to be clearly understood that this description is made only by way of example and not as a limitation of the scope of the invention.

The invention claimed is:

1. A method for preheating metal pellets before charging into a melting furnace, wherein the pellets are transported by a conveyor belt to a chute and discharged from the chute into the melting furnace, the method comprising:

heating the pellets by direct flame impingement from two or more banks of burners, wherein the two or more banks of burners comprise an upstream bank of burners and a downstream bank of burners;

controlling the upstream bank of burners to operate oxygen-rich so as to create an oxidizing zone and the downstream bank of burners to operate fuel-rich so as to create a reducing zone;

measuring at least one process condition; and controlling the two or more banks of burners based on the at least one process condition;

wherein when the at least one process condition is a concentration of one or more gases in the hot flue gas, adjusting the two or more banks of burners based on the concentration of one or more gases in the hot flue gas;

wherein when the at least one process condition is one or more temperatures selected from the list of the gas temperature, pellet temperature, or belt temperature, adjusting the two or more banks of burners based on the one or more temperatures; and wherein when the at least one process condition is a safety condition, shutting down the two or more banks of burners in the event the safety condition is detected.

2. The method of claim 1, wherein the two or more banks of burners comprise a conveyor bank of burners positioned to direct flames into contact with the pellets being transported by the conveyor belt and a chute bank of burners positioned to direct flames into contact with the pellets discharged from the chute into the melting furnace.

3. The method of claim 1, further comprising contacting the pellets with an inert fluid selected from the group consisting of an inert gas, an inert liquid, and a combination of an inert gas and an inert liquid to enable at least one of cooling the pellets and fire suppression of the pellets.

4. The method of claim 1, further comprising convectively heating the pellets by flowing a hot flue gas from the melting furnace over the pellets in a direction from the chute toward the conveyor.

5. The method of claim 1, further comprising mixing the pellets using one or more ploughs on the conveyor belt.

6. The method of claim 1, wherein the two or more banks of burners combust fuel with one or more of air, oxygen-enriched air having greater than 23% molecular O2, and industrial-grade oxygen having at least 70% molecular O2.

* * * * *